(12) United States Patent
Lu et al.

(10) Patent No.: US 11,211,070 B2
(45) Date of Patent: Dec. 28, 2021

(54) METHOD, DEVICE AND SYSTEM FOR DETECTING WORKING STATE OF TOWER CONTROLLER

(71) Applicant: BEIHANG UNIVERSITY, Beijing (CN)

(72) Inventors: Feng Lu, Beijing (CN); Ze Yang, Beijing (CN); Qinping Zhao, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 225 days.

(21) Appl. No.: 16/697,071

(22) Filed: Nov. 26, 2019

(65) Prior Publication Data
US 2020/0202854 A1 Jun. 25, 2020

(30) Foreign Application Priority Data
Dec. 24, 2018 (CN) .......................... 201811581277.2

(51) Int. Cl.
*G10L 21/00* (2013.01)
*G10L 25/00* (2013.01)
*G10L 15/22* (2006.01)
*G06F 3/16* (2006.01)
*G10L 15/30* (2013.01)
(Continued)

(52) U.S. Cl.
CPC .............. *G10L 15/22* (2013.01); *G06F 3/167* (2013.01); *G06F 40/30* (2020.01); *G06F 40/40* (2020.01); *G10L 15/26* (2013.01); *G10L 15/30* (2013.01); *G10L 2015/223* (2013.01)

(58) Field of Classification Search
None
See application file for complete search history.

(56) References Cited

U.S. PATENT DOCUMENTS 8,717,169 B2* 5/2014 Rodger .................. G08B 21/06
340/540
9,922,569 B2* 3/2018 Bilek .................... G08G 5/0008
(Continued)

FOREIGN PATENT DOCUMENTS

CN 102749991 A 10/2012
CN 107126224 A 9/2017
(Continued)

OTHER PUBLICATIONS

The first Office Action of the priority Chinese application No. 201811581277.2.

*Primary Examiner* — Satwant K Singh
(74) *Attorney, Agent, or Firm* — J.C. Patents

(57) ABSTRACT

The present disclosure provides a method, device and system for detecting a working state of a tower controller, the method includes: collecting voice data of a tower controller, and extracting a keyword from the voice data; acquiring a video image of the tower controller, and acquiring a gaze area of the tower controller from the video image; analyzing and detecting whether the tower controller has correctly accomplished an observation action according to the gaze area of the tower controller and the keyword. The present disclosure implements more efficient and accurate detection on the working state of the tower controller, and at the same time ensures the safety of an aircraft in an airport area and reduces a risk of colliding with other obstacles.

15 Claims, 5 Drawing Sheets

(51) Int. Cl.
    *G10L 15/26* (2006.01)
    *G06F 40/30* (2020.01)
    *G06F 40/40* (2020.01)

(56) References Cited

U.S. PATENT DOCUMENTS

| | | | |
|---|---|---|---|
| 10,124,907 B1 * | 11/2018 | Gavrilets | B64C 27/006 |
| 10,157,616 B2 * | 12/2018 | Agarwal | G10L 15/26 |
| 2017/0032576 A1 * | 2/2017 | Mazoyer | B64D 43/00 |
| 2017/0186203 A1 * | 6/2017 | Fournier | G08G 5/0091 |
| 2018/0233052 A1 * | 8/2018 | Shamasundar | G08G 5/0013 |

FOREIGN PATENT DOCUMENTS

| | | |
|---|---|---|
| CN | 108171152 A | 6/2018 |
| CN | 108549848 A | 9/2018 |

\* cited by examiner

METHOD, DEVICE AND SYSTEM FOR DETECTING WORKING STATE OF TOWER CONTROLLER

CROSS-REFERENCE TO RELATED APPLICATION

This application claims priority to Chinese Patent Application No. 201811581277.2, filed on Dec. 24, 2018, which is hereby incorporated by reference in its entirety.

TECHNICAL FIELD

The present disclosure relates to the technical field of computer recognition, in particular to a method, device and system for detecting a working state of a tower controller.

BACKGROUND

With the rapid development of aviation aircraft, there are more and more aircraft. To ensure a safe and orderly flight, air traffic controllers need to utilize communication, navigation technology and monitoring means to monitor and control aircraft flight activities, where a tower controller is primarily responsible for the takeoff and landing of an airplane.

In recent years, aircraft ground friction or collision accidents have occurred frequently in the airport. In addition to the causes that the airport has reached or is about to reach saturation and the number of aircrafts has increased sharply, violation operations and manual errors of tower controllers are also an important cause of runway incursions and aircraft collisions.

However, although with the continuous introduction of new technologies and new equipment for air traffic control, a variety of intelligent equipment can be placed on a tower for auxiliary work of the tower, the most critical control work still needs to be undertaken manually by the tower controller, especially during an entire process of the taking off, landing, taxiing from a runway to a parking bay, and taxiing from the parking bay to the runway of an airplane, the tower controller is required to observe implementation situations of the runway. Therefore, once mistakes, forgetfulness, omissions, overloaded work or fatigued work occurred during air traffic controlling by a tower controller, resulting in failure to comply with the regulations to accomplish control commands, the risk of aircraft friction or even collision will increase, which causes a safety hazard.

SUMMARY

The present disclosure provides a method, device and system for detecting a working state of a tower controller, so as to improve the accuracy and efficiency in detection of the working state of the tower controller, and at the same time ensure the safety of an aircraft in an airport area and reduce a collision risk with other obstacles.

In a first aspect, a method for detecting a working state of a tower controller provided by an embodiment of the present disclosure, includes:

collecting voice data of the tower controller and extracting a keyword from the voice data;

acquiring a video image of the tower controller and acquiring a gaze area of the tower controller from the video image; and analyzing and detecting whether the tower controller has correctly accomplished an observation action according to the gaze area of the tower controller and the keyword.

In a possible design, the extracting a keyword from the voice data, includes:

extracting word information in continuous voice data of the tower controller, and extracting the keyword by utilizing a preset keyword vocabulary to filter and match.

In a possible design, the extracting a keyword from the voice data, includes:

inputting the voice data of the tower controller into a voice model, and identifying the keyword through the voice model, where the voice model is obtained by preset voice data training or analytical modeling.

In a possible design, the acquiring a gaze area of the tower controller from the video image, includes:

extracting feature points of the video image through a preset face model, where the feature points are used to characterize face information of the tower controller;

matching the feature points with a three-dimensional head model to obtain head position and posture data;

determining a human eye area according to the feature points, and acquiring a line of sight direction of the tower controller according to the human eye area; and obtaining the gaze area of the tower controller according to the line of sight direction of the tower controller and the head position and posture data.

In a possible design, the acquiring a gaze area of the tower controller from the video image, includes:

inputting the video image of the tower controller into a preset training model, and directly learning to obtain a line of sight direction of the tower controller and head position and posture data; and obtaining the gaze area of the tower controller according to the line of sight direction of the tower controller and the head position and posture data.

In a possible design, the analyzing and detecting whether the tower controller has correctly accomplished an observation action according to the gaze area of the tower controller and the keyword, includes:

matching the gaze area of the tower controller with the keyword, and if the gaze area of the tower controller matches the keyword, then it is determined that the tower controller has correctly accomplished the observation action; otherwise, it is determined that the tower controller has not correctly accomplished the observation action.

In a possible design, after analyzing and detecting whether the tower controller has correctly accomplished the observation action according to the gaze area of the tower controller and the keyword, the method further includes:

performing a prompt or warning in a preset manner if it is determined that the tower controller has not correctly accomplished the observation action; where the preset manner includes: any one or any combination of an image, a text, and a voice.

In a second aspect, a device for detecting a working state of a tower controller provided by an embodiment of the present disclosure, includes:

a collecting module, configured to collect voice data of the tower controller, and extract a keyword from the voice data;

an acquiring module, configured to acquire a video image of the tower controller, and acquire a gaze area of the tower controller from the video image; and a detecting module, configured to analyze and detect whether the tower controller has correctly accomplished an observation action according to the gaze area of the tower controller and the keyword.

In a possible design, the collecting module is specifically configured to:

extract word information in continuous voice data of the tower controller, and extract the keyword by utilizing a preset keyword vocabulary to filter and match.

In one possible design, the collecting module is specifically configured to:

input the voice data of the tower controller into a voice model, and identify the keyword through the voice model, where the voice model is obtained by preset voice data training or analytical modeling.

In a possible design, the acquiring module is specifically configured to:

extract feature points of the video image through a preset face model, where the feature points are used to characterize face information of the tower controller;

match the feature points with a three-dimensional head model to obtain head position and posture data;

determine a human eye area according to the feature points, and acquire a line of sight direction of the tower controller according to the human eye area; and obtain the gaze area of the tower controller according to the line of sight direction of the tower controller and the head position and posture data.

In a possible design, the acquiring module is specifically configured to:

input the video image of the tower controller into a preset training model, and directly learn to obtain a line of sight direction of the tower controller and head position and posture data; and obtain the gaze area of the tower controller according to the line of sight direction of the tower controller and the head position and posture data.

In a possible design, the detecting module is specifically configured to:

match the gaze area of the tower controller with the keyword, and if the gaze area of the tower controller matches the keyword, then it is determined that the tower controller has correctly accomplished the observation action; otherwise, it is determined that the tower controller has not correctly accomplished the observation action.

In a possible design, the device further includes:

a warning module, configured to perform a prompt or warning in a preset manner if it is determined that the tower controller has not correctly accomplished the observation action; where the preset manner includes: any one or any combination of an image, a text, and a voice.

In a third aspect, a system for detecting a working state of a tower controller provided by an embodiment of the present disclosure, includes a memory and a processor. The memory stores executable instructions of the processor; where the processor is configured to perform the method for detecting a working state of a tower controller as described in any one of the first aspect by executing the executable instructions.

In a fourth aspect, a computer readable storage medium provided by an embodiment of the present disclosure, having a computer program stored thereon, where when the program is executed by a processor, the method for detecting a working state of a tower controller as described in any one of the first aspect is implemented.

The present disclosure provides a method, device and system for detecting a working state of a tower controller, the method includes: collecting voice data of a tower controller, and extracting a keyword from the voice data, acquiring a video image of the tower controller, and acquiring a gaze area of the tower controller from the video image; analyzing and detecting whether the tower controller has correctly accomplished an observation action according to the gaze area of the tower controller and the keyword. The present disclosure implements more efficient and accurate detection on the working state of the tower controller, and at the same time ensures the safety of the aircraft in the airport area and reduces the collision risk with other obstacles.

BRIEF DESCRIPTION OF DRAWINGS

In order to more clearly illustrate the technical solutions in the embodiments of the present disclosure or in the prior art, the drawings needed to be used in the description of the embodiments or the prior art will be briefly described below. Obviously, the drawings in the following description are some embodiments of the present disclosure, for those skilled in the art, other drawings can be obtained according to these drawings without any creative efforts.

The specific embodiments of the present disclosure have been shown through the above drawings, and there will be more detail description later. The drawings and text description are intended to illustrate the concept of the present disclosure for those skilled in the art by reference to the specific embodiments, rather than to limit the scope of the present disclosure conception in any way.

DESCRIPTION OF EMBODIMENTS

In order to make the objects, technical solutions and advantages of the embodiments of the present disclosure more clear, the technical solutions in the embodiments of the present disclosure will be clearly and completely described in combination with the drawings in the embodiments of the present disclosure. Obviously, the described embodiments are part of the embodiments of the present disclosure, but not all of the embodiments. Based on the embodiments of the present disclosure, all other embodiments obtained by those skilled in the art without creative efforts are within the protection scope of the present disclosure.

The terms "first", "second", "third", "fourth", or the like (if present) in the specification and claims and the above brief description of drawings of the present disclosure are used to distinguish similar objects without being used to describe a specific order or precedence order. It is to be understood that the data used as this may be interchanged in appropriate cases, such that the embodiments of the present disclosure described herein can be implemented, for example, in a sequence except those illustrated or described herein. In addition, the terms "include" and "have" and any variant thereof are intended to cover a non-exclusive inclusion, for example, a process, method, system, product, or device that include a series of steps or units are not necessarily limited to those steps or units explicitly listed, and may include other steps or units that are not explicitly listed or inherent to these process, method, product or device.

The technical solutions of the present disclosure and how the technical solutions of the present disclosure solve the above technical problems will be described in detail below with specific embodiments. The following specific embodiments may be combined with each other, and the same or similar concepts or processes may not be described in detail in some embodiments. The embodiments of the present disclosure will be described below with reference to the accompanying drawings.

Figure 1:
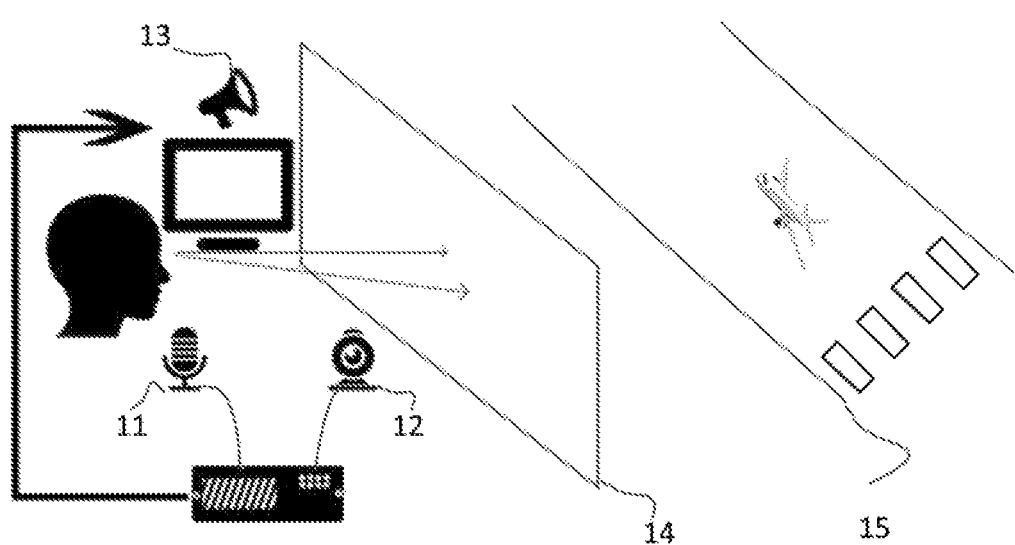
FIG. 1 is a schematic diagram of an application scenario of the present disclosure.

FIG. 1 is a schematic diagram of an application scenario of the present disclosure. As shown in FIG. 1, a system for detecting a working state of a tower controller may include a microphone 11, a camera 12, and a warning device 13. The tower controller observes processes of taking off, landing, taxiing, or the like of aircraft in an airport runway area 15 through a tower window 14 and issues observation instructions to ensure safe operations of the aircraft and avoid collision with other obstacles. Specifically, the system for detecting a working state of a tower controller utilizes the microphone 11 to collect voice data of the tower controller, and extracts a keyword from the voice data; utilizes the camera 12 to acquire a video image of the tower controller, and acquires a gaze area of the tower controller from the video image; and analyzes and detects whether the tower controller has correctly accomplished an observation action according to the gaze area of the tower controller and the keyword. If it is determined that the tower controller has not correctly accomplished the observation action, the warning device 13 is utilized to perform a prompt or warning in a preset manner. The present disclosure can detect the working state of the tower controller more efficiently and accurately, and at the same time, ensures the safety of the aircraft in the airport area and reduces the collision risk with other obstacles.

Figure 2:
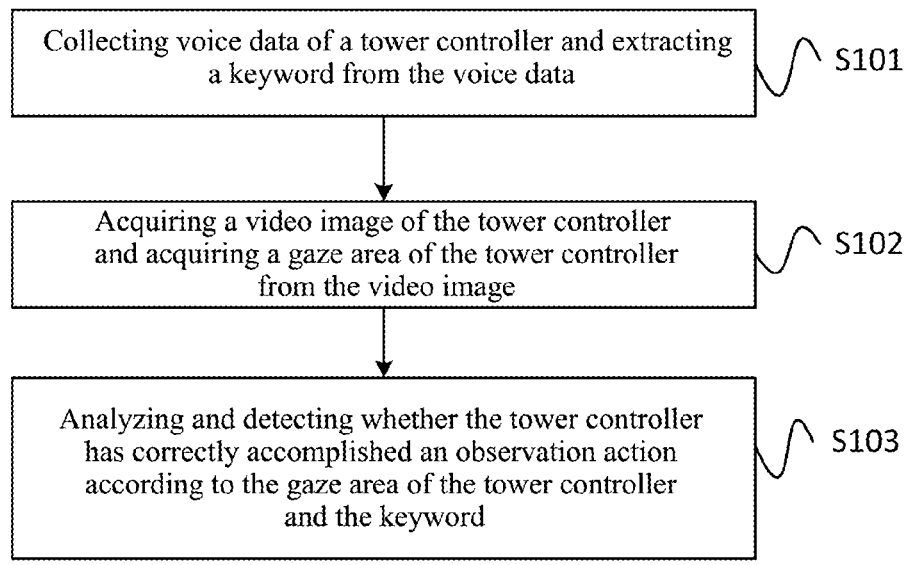
FIG. 2 is a flowchart of a method for detecting a working state of a tower controller according to a first embodiment of the present disclosure.

FIG. 2 is a flowchart of a method for detecting a working state of a tower controller according to a first embodiment of the present disclosure. As shown in FIG. 2, the method in this embodiment may include:

S101. Collecting voice data of a tower controller and extracting a keyword from the voice data.

Specifically, in an optional embodiment, the system for detecting a working state of a tower controller may employ an audio processing software to acquire the voice data or may employ a microphone to record the voice data of the tower controller. In an optional embodiment, the extracting a keyword from the voice data may include: extracting word information in continuous voice data of the tower controller, and extracting the keyword by utilizing a preset keyword vocabulary to filter and match. The keyword may include or contain corresponding indicative verbs, and may also include target action information, a target location, target aircraft information, and the like.

In this embodiment, the system for detecting a working state of a tower controller employs the microphone to collect the voice data of the tower controller. In a possible embodiment, the voice data is preprocessed to minimize an interference effect caused by factors such as environmental noise, channel, speakers or the like, and then the word information is then detected from a continuous voice stream in frames, and word segmentation processing is performed for the word information. For example, the detected word information is "aircraft xx can take off", which is word segmentation processed as "aircraft/xx/can take off", and further filtering and matching are performed by utilizing the preset keyword vocabulary, where the keyword vocabulary can be referred to as shown in Table 1 below, the system for detecting a working state of a tower controller extracts a keyword "can take off".

TABLE 1

| Keyword vocabulary | | | |
|---|---|---|---|
| No. | Target action information | Target location | Target aircraft |
| 1 | entering the airport | . . . | x |
| 2 | leaving the airport | X1 | . . . |
| 3 | taxiing | . . . | y |
| 4 | can take off | Y2 | xy |

In an optional embodiment, the system for detecting a working state of a tower controller extracting the keyword from the voice data may include: inputting the voice data of the tower controller into a voice model, and identifying the keyword through the voice model, where the voice model is obtained by preset voice data training or analytical modeling. For example, the voice model is obtained by training based on a large number of different language data, and may include an Acoustic Model (AM), a Traditional Model CTC (Connectionist Temporal Classification) model, a Language Model (LM), and an end-to-end model or the like.

S102. Acquiring a video image of the tower controller and acquiring a gaze area of the tower controller from the video image.

Specifically, the system for detecting a working state of a tower controller can employ a monocular or binocular camera to collect the video image of the tower controller. In an optional embodiment, the system acquiring the gaze area of the tower controller from the video image may include extracting feature points of the video image through a preset face model, where the feature points are used to characterize face information of the tower controller; matching the feature points with a three-dimensional head model to obtain head position and posture data; determining a human eye area according to the feature points, and acquiring a line of sight direction of the tower controller according to the human eye area; and obtaining the gaze area of the tower controller according to the line of sight direction of the tower controller and the head position and posture data.

In this embodiment, the system for detecting a working state of a tower controller may extract face feature points in the video image through the preset face model, and these feature points are used to characterize the face information of the tower controller in the video image. For example, a SIFT (Scale-invariant feature transform) feature extraction method is employed to find key feature points of the video image at different scales, and a direction histogram is used to describe as the face information of the tower controller in the video image. The feature points are matched with the three-dimensional head model, and a corresponding relationship is established between the three-dimensional head model and the video image, and head position and posture estimation is acquired by geometric or other methods to obtain the head position and posture data. The head model used here can be either a simple geometric shape, such as a cylinder, or may be a certain geometric structure, or a general-purpose three-dimensional head model, and may also be a three-dimensional head model obtained by laser scanning or other methods. Further, a regional human eye area (for example, including an eye corner, an eye contour, an eyelid and a pupil center, and the like) in the video image is determined according to the feature points, and the line of sight direction of the tower controller is acquired according to the human eye area. In an optional embodiment, the line of sight direction of the tower controller is acquired through a method of calculating the line of sight direction vector by employing a geometric relationship. For example, a ray is emitted from an origin of the camera through the pupil center of an image plane, and an intersection of the origin of the camera and an eyeball surface is calculated. The intersection is a three-dimensional coordinate of the pupil in a camera coordinate system, and a direction vector from an eyeball center to the intersection is the line of sight direction vector. Further, an inclined angle of the line of sight direction vector and a horizontal direction and an inclined angle of the line of sight direction vector and a vertical direction are respectively calculated, according to which looking down, looking at the front horizontally, and looking up are distinguished. Finally, the gaze area of the tower controller is obtained according to the line of sight direction of the tower controller and the head position and posture data.

In an optional embodiment, the system for detecting a working state of a tower controller acquiring the gaze area of the tower controller from the video image may include: inputting the video image of the tower controller into a preset training model, and directly learning to obtain the line of sight direction of the tower controller and the head position and posture data; and acquiring the gaze area of the tower controller according to the line of sight direction of the tower controller and the head position and posture data. The preset training model, for example, a convolutional neural network model proposed by means of convolution, pooling, nonlinear variation, or the like, can acquire more essential visual features of the video image to improve the accuracy in detection of the working state of the tower controller. In an optional embodiment, the preset training model adopts other methods for head posture, such as an n-point perspective problem or the like, for example, the three-dimensional model is matched with positions of facial feature points, and finally posture parameters are obtained for a head posture estimation, and the result obtained is taken as a corresponding posture estimation for the tower controller. Specifically, the video image of the tower controller is matched and analyzed by extracting global feature points, to obtain the line of sight direction of the tower controller and the head position and posture data; and the gaze area of the tower controller is obtained according to the line of sight direction of the tower controller and the head position and posture data.

It should be noted that the implementation of step S101 and step S102 does not specifically limit the sequence, and the video image of the tower controller may be acquired while the voice data of the tower controller is collected; or the video image of the tower controller is acquired when the voice data of the tower controller is collected and the keyword are extracted; and the video image of the tower controller may also be acquired in real time regardless of whether the voice data of the tower controller is collected, or the like. Those skilled in the art can arrange the implementation of step S101 and step S102 according to actual conditions to obtain better effects.

In an optional embodiment, the system for detecting a tower controller may further include an infrared light-filling device or an LED light-filling device configured with the camera. When the ambient light of the tower is not ideal, the video image of the tower controller is collected by utilizing the above light-filling devices cooperated with the camera to make the image clear and the signal-to-noise ratio high, so as to improve the efficiency in detection of the working state of the tower controller.

S103. Analyzing and detecting whether the tower controller has correctly accomplished an observation action according to the gaze area of the tower controller and the keyword.

Specifically, the gaze area of the tower controller is matched with the keyword, and if the gaze area of the tower controller matches the keyword, it is determined that the tower controller has correctly accomplished the observation action; otherwise, it is determined that the tower controller has not correctly accomplished the observation action.

In this embodiment, a current gaze area of the tower controller (refer to FIG. 1) is matched with a keyword (for example, entering a runway), if a real-time gaze area of the tower controller (for example, a relevant area before entering the runway) matches the keyword "entering a runway", then it is determined that the tower controller has correctly accomplished the observation action; otherwise, it is determined that the tower controller has not correctly accomplished the observation action. In an optional embodiment, the keyword has a corresponding relationship with a preset gaze area of the tower controller, when an overlapping area of the real-time gaze area of the tower controller and the preset gaze area of the tower controller is greater than or equal to a threshold (for example, the threshold is 0.5, the overlapping area is 0.8, then 0.8>0.5), a judgment value 1 of the tower controller observation action is output, and it is determined that the tower controller has correctly accomplished the observation action. In an optional embodiment, whether the tower controller has correctly accomplished the observation action is determined by means of employing the judgment value of the tower controller observation action. For example, if the judgment value of the tower controller having correctly accomplished the observation action is 1, then the judgment value of having not correctly accomplished the observation action is 0; or whether the tower controller has correctly accomplished the observation action is embodied by employing a continuous judgment value between 0-1, when the judgment value is greater than or equal to the threshold (for example, 0.5), it is determined that the tower controller has correctly accomplished the observation action; if the judgment value is less than the threshold (for example, 0.5), it is determined that the tower controller has not correctly accomplished the observation action.

Figure 3:
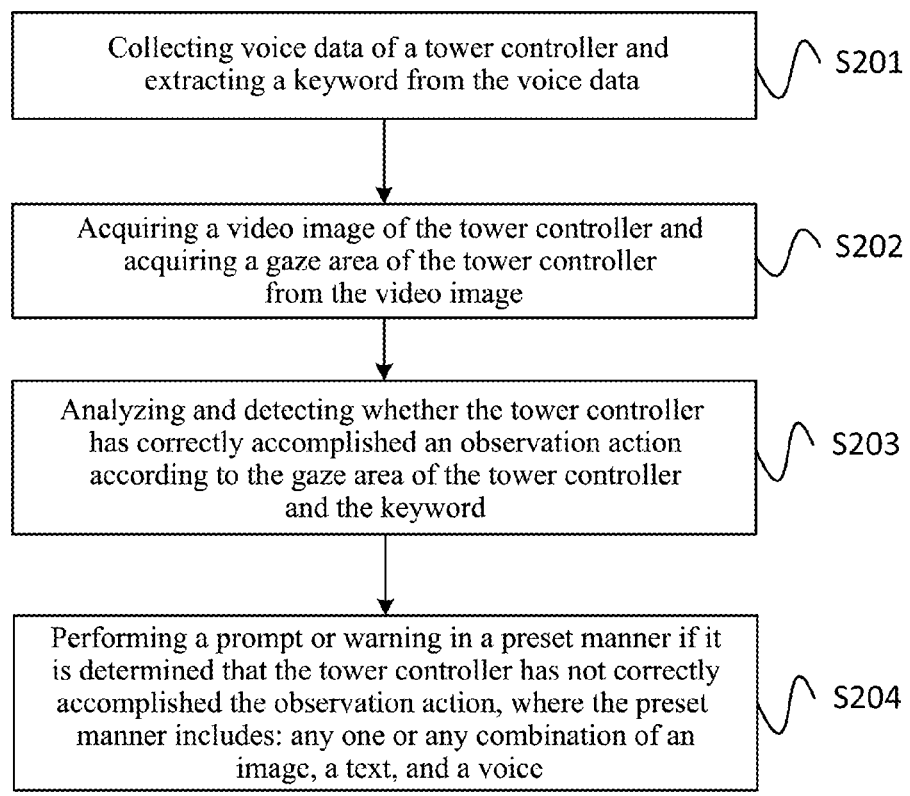
FIG. 3 is a flowchart of a method for detecting a working state of a tower controller according to a second embodiment of the present disclosure.

FIG. 3 is a flowchart of a method for detecting a working state of a tower controller according to a second embodiment of the present disclosure. As shown in FIG. 3, the method for detecting a working state of a tower controller of the present embodiment may include:

S201. Collecting voice data of a tower controller and extracting a keyword from the voice data.

S202. Acquiring a video image of the tower controller and acquiring a gaze area of the tower controller from the video image.

S203. Analyzing and detecting whether the tower controller has correctly accomplished an observation action according to the gaze area of the tower controller and the keyword.

In this embodiment, reference can be made to the related description in the step S101 to step S103 in the method shown in FIG. 2 for specific implementation processes and technical principles of the step S201 to step S203, and details are not described herein again.

S204. Performing a prompt or warning in a preset manner if it is determined that the tower controller has not correctly accomplished the observation action; where the preset manner includes: any one or any combination of an image, a text, and a voice.

Specifically, after analyzing and detecting whether the tower controller has correctly accomplished the observation action according to the gaze area of the tower controller and the keyword, if it is determined that the tower controller has not correctly accomplished the observation action, the prompt or warning is then performed by the preset manner; the preset manner includes: any one or any combination of the image, the text, and the voice.

In this embodiment, the system for detecting a working state of a tower controller analyzes and detects that the tower controller has not correctly accomplished the observation action according to the gaze area of the tower controller and the keyword. For example, the keyword has a corresponding relationship with a preset gaze area of the tower controller, when an overlapping area of a real-time gaze area of the tower controller and the preset gaze area of the tower controller is less than a threshold (for example, the threshold is 0.5, the overlapping area is 0.3, then 0.3<0.5), a judgment value 0 of the tower controller observation action is output, and it is determined that the tower controller has not correctly accomplished the observation action. Then the warning is performed according to a preset voice reminder (for example, "please pay attention to the observation area yx") by utilizing the warning device in the system. The preset warning manner includes: any one or any combination of an image, a text, and a voice.

In this embodiment, after automatically detecting whether the tower controller has correctly accomplished the observation action, the tower controller is prompted or warned by any one or any combination of the image, the text, and the voice, thereby ensuring the safety of the aircraft in the airport area to a certain extent, and reducing the collision risk with other obstacles.

Figure 4:
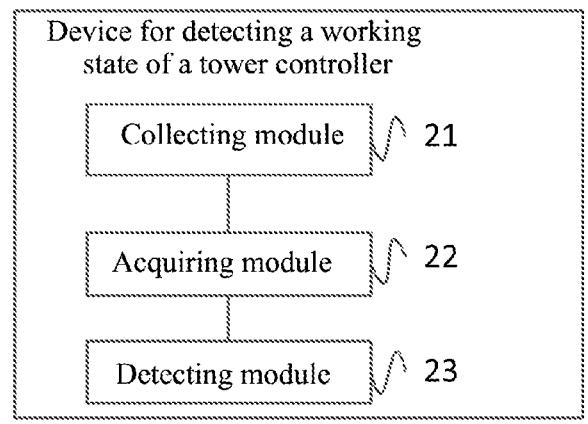
FIG. 4 is a schematic structural diagram of a device for detecting a working state of a tower controller according to a third embodiment of the present disclosure.

FIG. 4 is a schematic structural diagram of a device for detecting a working state of a tower controller according to a third embodiment of the present disclosure. As shown in FIG. 4, the device for detecting a working state of a tower controller of the present embodiment may include:

a collecting module 21, configured to collect voice data of a tower controller and extract a keyword from the voice data;

an acquiring module 22, configured to acquire a video image of the tower controller, and acquire a gaze area of the tower controller from the video image; and a detecting module 23, configured to analyze and detect whether the tower controller has correctly accomplished an observation action according to the gaze area of the tower controller and the keyword.

In a possible design, the extracting a keyword from the voice data, includes:

extracting word information in continuous voice data of the tower controller, and extracting the keyword by utilizing a preset keyword vocabulary to filter and match.

In a possible design, the extracting a keyword from the voice data, includes:

inputting the voice data of the tower controller into a voice model, and identifying the keyword through the voice model, where the voice model is obtained by preset voice data training or analytical modeling.

In a possible design, the acquiring the gaze area of the tower controller from the video image, includes:

extracting feature points of the video image through a preset face model, where the feature points are used to characterize face information of the tower controller;

matching the feature points with a three-dimensional head model to obtain head position and posture data;

determining a human eye area according to the feature points, and acquiring a line of sight direction of the tower controller according to the human eye area; and obtaining the gaze area of the tower controller according to the line of sight direction of the tower controller and the head position and posture data.

In a possible design, the acquiring the gaze area of the tower controller from the video image, includes:

inputting the video image of the tower controller into a preset training model, and directly learning to obtain a line of sight direction of the tower controller and head position and posture data; and obtaining the gaze area of the tower controller according to the line of sight direction of the tower controller and the head position and posture data.

In one possible design, the detecting module 23 is specifically configured to:

match the gaze area of the tower controller with the keyword, and if the gaze area of the tower controller matches the keyword, then it is determined that the tower controller has correctly accomplished the observation action; otherwise, it is determined that the tower controller has not correctly accomplished the observation action.

The device for detecting a working state of a tower controller of the present embodiment can perform the technical solution in the method shown in FIG. 2, for the specific implementation processes and technical principles, reference can be made to the related description in the method shown in FIG. 2, and details are not described herein again.

Figure 5:
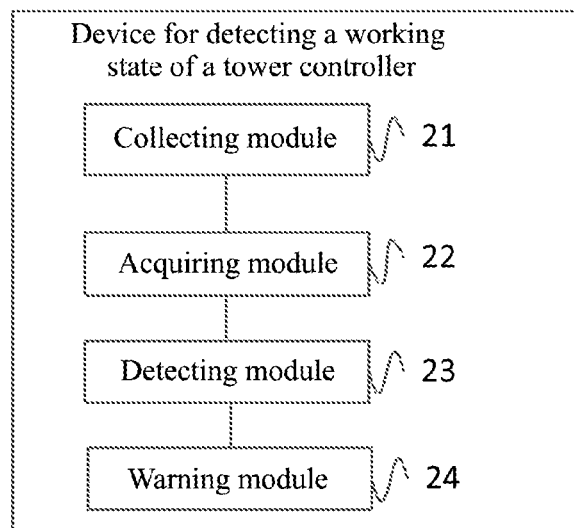
FIG. 5 is a schematic structural diagram of a device for detecting a working state of a tower controller according to a fourth embodiment of the present disclosure.

FIG. 5 is a schematic structural diagram of a device for detecting a working state of a tower controller according to a fourth embodiment of the present disclosure. As shown in FIG. 5, the device for detecting a working state of a tower controller of the present embodiment, based on the device shown in FIG. 4, may further includes: a warning module 24, which is specifically configured to: perform a prompt or warning in a preset manner if it is determined that the tower controller has not correctly accomplished the observation action, where the preset manner includes: any one or any combination of an image, a text, and a voice.

The device for detecting a working state of a tower controller of the present embodiment can perform the technical solution in the method shown in FIG. 3, for the specific implementation processes and technical principles, reference can be made to the related description in the method shown in FIG. 3, and details are not described herein again.

Figure 6:
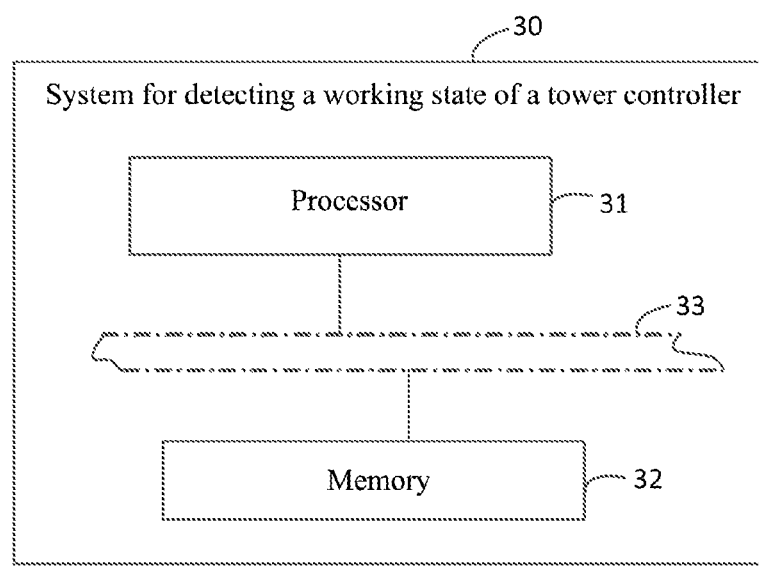
FIG. 6 is a schematic structural diagram of a system for detecting a working state of a tower controller according to a fifth embodiment of the present disclosure.

FIG. 6 is a schematic structural diagram of a system for detecting a working state of a tower controller according to a fifth embodiment 5 of the present disclosure. As shown in FIG. 6, a system for detecting a working state of a tower controller 30 of the present embodiment may include: a processor 31 and a memory 32.

The memory 32 is configured to store computer programs (such as application programs, function modules, or the like for implementing the above methods for detecting a working state of a tower controller), computer instructions, and the like;

The computer programs, computer instructions, and the like described above may be partitioned and stored in one or more memories 32. And the above computer programs, computer instructions, data, and the like can be called by the processor 31.

The processor 31 is configured to execute the computer programs stored in the memory 32 to implement various steps in the methods involved in the above embodiments.

For details, refer to the related description in the foregoing method embodiments.

The processor 31 and the memory 32 may be independent structures or an integrated structure integrated together. When the processor 31 and the memory 32 are independent structures, the memory 32 and the processor 31 can be coupled through a bus 33.

The processor in this embodiment can perform the technical solutions in the methods shown in FIG. 2 and FIG. 3, for the specific implementation processes and technical principles, reference can be made to the related description in the methods shown in FIG. 2 and FIG. 3, and details are not described herein again.

In addition, an embodiment of the present disclosure further provides a computer readable storage medium, in which computer execution instructions are stored. When at least one processor of a user equipment executes the computer execution instructions, the user equipment performs the above various possible methods.

The computer readable medium includes a computer storage medium and a communication medium, where the communication medium includes any medium that facilitates transferring a computer program from one location to another. The storage medium may be any available media that can be accessed by a general purpose or a dedicated computer. An exemplary storage medium is coupled to the processor to enable the processor to read information from, and write information to, the storage medium. Of course, the storage medium can also be a constituent part of the processor. The processor and the storage medium may be located in an ASIC. Additionally, the ASIC may be located in the user equipment. Of course, the processor and the storage medium may also reside as discrete components in a communication device.

One of ordinary skill in the art will appreciate that all or part of the steps to implement the various method embodiments described above may be accomplished by a program instructing related hardware. The aforementioned program can be stored in a computer readable storage medium. The program, when executed, performs the steps including the above various method embodiments; and the foregoing storage medium includes various medium that can store program codes, such as a ROM, a RAM, a magnetic disk, or an optical disk or the like.

Finally, it should be noted that the above embodiments are merely intended for describing, rather than limiting, the technical solutions of the present disclosure; although the present disclosure has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present disclosure.

What is claimed is:

1. A method for detecting a working state of a tower controller, comprising:
   collecting voice data of a tower controller and extracting a keyword from the voice data;
   acquiring a video image of the tower controller and acquiring a gaze area of the tower controller from the video image; and
   analyzing and detecting whether the tower controller has correctly accomplished an observation action according to the gaze area of the tower controller and the keyword.

2. The method according to claim 1, wherein the extracting a keyword from the voice data, comprises:
   extracting word information in continuous voice data of the tower controller, and extracting the keyword by utilizing a preset keyword vocabulary to filter and match.

3. The method according to claim 1, wherein the extracting a keyword from the voice data, comprises:
   inputting voice data of the tower controller into a voice model, and identifying the keyword through the voice model, wherein the voice model is obtained by preset voice data training or analytical modeling.

4. The method according to claim 1, wherein the acquiring a gaze area of the tower controller from the video image, comprises:
   extracting feature points of the video image through a preset face model, wherein the feature points are used to characterize face information of the tower controller;
   matching the feature points with a three-dimensional head model to obtain head position and posture data;
   determining a human eye area according to the feature points, and acquiring a line of sight direction of the tower controller according to the human eye area; and
   obtaining the gaze area of the tower controller according to the line of sight direction of the tower controller and the head position and posture data.

5. The method according to claim 1, wherein the acquiring a gaze area of the tower controller from the video image, comprises:
   inputting the video image of the tower controller into a preset training model, and directly learning to obtain a line of sight direction of the tower controller and head position and posture data; and
   obtaining the gaze area of the tower controller according to the line of sight direction of the tower controller and the head position and posture data.

6. The method according to claim 1, wherein the analyzing and detecting whether the tower controller has correctly accomplished an observation action according to the gaze area of the tower controller and the keyword, comprises:
   matching the gaze area of the tower controller with the keyword, and if the gaze area of the tower controller matches the keyword, then it is determined that the tower controller has correctly accomplished the observation action; otherwise, it is determined that the tower controller has not correctly accomplished the observation action.

7. The method according to claim 1, wherein after analyzing and detecting whether the tower controller has correctly accomplished the observation action according to the gaze area of the tower controller and the keyword, the method further comprises:
   performing a prompt or warning in a preset manner if it is determined that the tower controller has not correctly accomplished the observation action, where the preset manner comprises: any one or any combination of an image, a text, and a voice.

8. A system for detecting a working state of a tower controller, comprising: a memory and a processor, wherein the memory stores executable instructions of the processor, and the processor when executing the executable instructions is configured to:

collect voice data of a tower controller, and extract a keyword from the voice data;

acquire a video image of the tower controller, and acquire a gaze area of the tower controller from the video image; and analyze and detect whether the tower controller has correctly accomplished an observation action according to the gaze area of the tower controller and the keyword.

9. The system according to claim 8, wherein the processor is further configured to:

extract word information in continuous voice data of the tower controller, and extract the keyword by utilizing a preset keyword vocabulary to filter and match.

10. The system according to claim 8, wherein the processor is further configured to:

input the voice data of the tower controller into a voice model, and identify the keyword through the voice model, wherein the voice model is obtained by preset voice data training or analysis modeling.

11. The system according to claim 8, wherein the processor is further configured to:

extract feature points of the video image through a preset face model, wherein the feature points are used to characterize face information of the tower controller;

match the feature points with a three-dimensional head model to obtain head position and posture data;

determine a human eye area according to the feature points, and acquire a line of sight direction of the tower controller according to the human eye area; and obtain the gaze area of the tower controller according to the line of sight direction of the tower controller and the head position and posture data.

12. The system according to claim 8, wherein the processor is further configured to:

input the video image of the tower controller into a preset training model, and directly learn to obtain a line of sight direction of the tower controller and head position and posture data; and obtain the gaze area of the tower controller according to the line of sight direction of the tower controller and the head position and posture data.

13. The system according to claim 8, wherein the processor is further configured to:

match the gaze area of the tower controller with the keyword, and if the gaze area of the tower controller matches the keyword, then it is determined that the tower controller has correctly accomplished the observation action; otherwise, it is determined that the tower controller has not accomplished the observation action.

14. The system according to claim 8, the processor is further configured to:

perform a prompt or warning in a preset manner if it is determined that the tower controller has not correctly accomplished the observation action, wherein the preset manner comprises: any one or any combination of an image, a text, and a voice.

15. A computer readable storage medium, having a computer program stored thereon, wherein when the program is executed by a processor, the method for detecting a working state of a tower controller according to claim 1 is implemented.

* * * * *